Feb. 18, 1930.  L. G. WEYLANDT  1,747,497
DIFFERENTIAL VARIABLE SPEED POWER TRANSMISSION
Filed Sept. 4, 1928
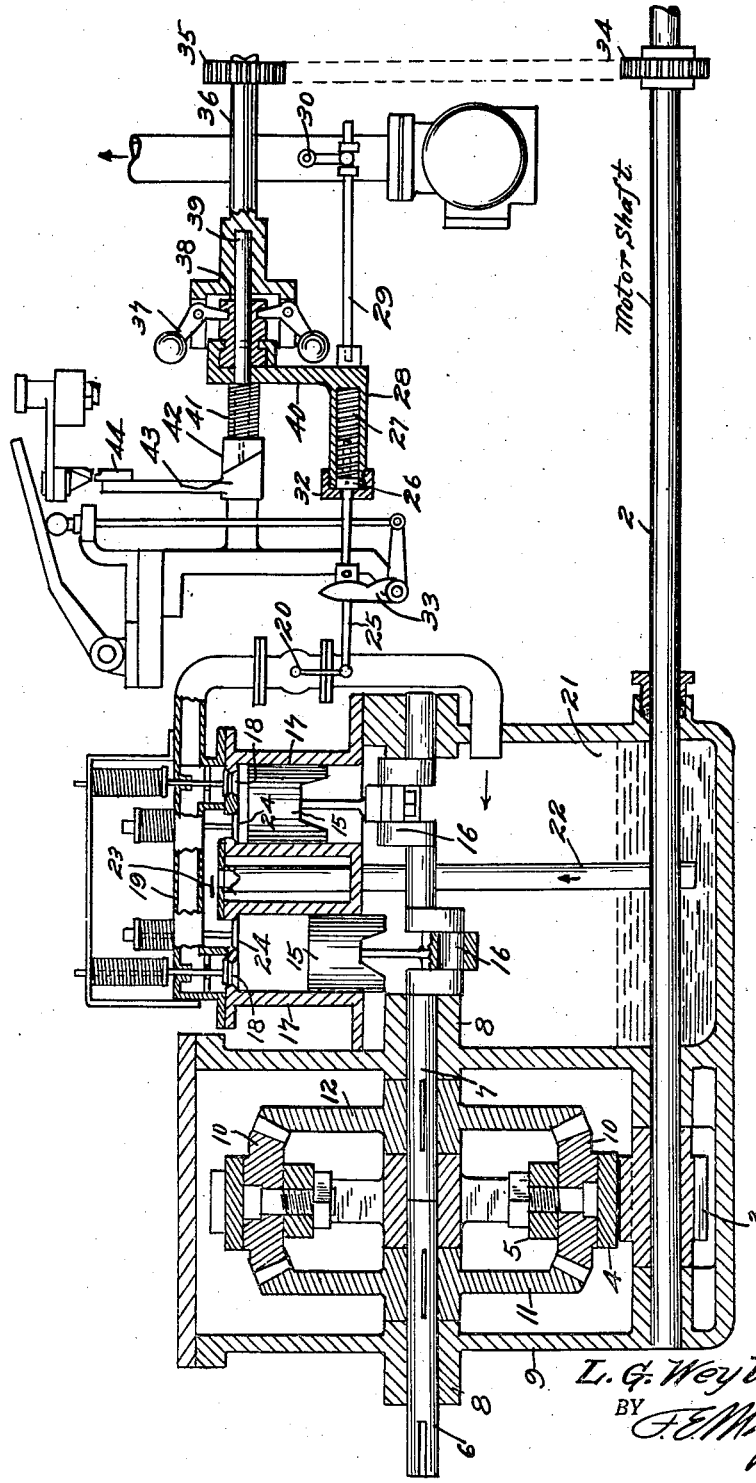
INVENTOR,
L. G. Weylandt;
BY
ATTORNEY.

Patented Feb. 18, 1930

1,747,497

UNITED STATES PATENT OFFICE

LAWRENCE G. WEYLANDT, OF CALEXICO, CALIFORNIA

DIFFERENTIAL VARIABLE-SPEED POWER TRANSMISSION

Application filed September 4, 1928. Serial No. 303,776.

This invention relates to power transmitting mechanism and especially to automatic, motor speed control and to a variable speed, power delivery train.

One object of the present invention is to provide a transmission mechanism which will have a constant speed at the delivery or final drive end and will automatically regulate engine speed in accordance with increase or decrease in the load resistance so as to maintain constant final drive speed.

A further object is to provide a manual speed control for varying the final drive speed.

A general object is to provide a self-regulating prime motor and variable speed transmission, and to provide a non-stalling motor and power train.

A purpose is to eliminate clutch means and avoid the use of shift gears in speed changing actions, and to obtain any selection of final drive speed from minimum to maximum by stepless increment or decrement.

The invention consists of the mechanism and the combination, and the sub-combination of means and parts, and other objects, advantages and features of the preferred embodiment herewith illustrated will be made manifest in the ensuing description; it being understood that modifications, variations and adaptations may be resorted to within the spirit, scope and principles of the invention as it is more directly claimed hereinafter.

The drawing is a schematic diagram of the invention; parts being in section.

In the present concept a motor shaft 2 is provided with a pinion 3 which is in constant mesh with a ring-gear 4 of a differential spider 5. In the spider are journaled the near ends of co-axial spindle 6 and a pump shaft 7 which are supported in bearings 8 in a gear box 9 in which the pinion shaft is also journaled.

The spider 5 is provided with a set of radial gears 10 engaging, at one side, with a companion gear 11 fixed on the final drive spindle 6, and at the opposite side meshing with a similar gear 12 fixed on the pump shaft 7. This is a conventional "differential" gear means.

Means are incorporated to control the gear 12 and thereby regulate the speed of gear 11 and final drive shaft regardless of the speed of the motor shaft 2. This control means includes a hydraulic resistance device in which pistons 15 are connected to opposed cranks 16, of the shaft 7, and operate in cylinders 17 having spring closed outlet valves 18 leading to a manifold conduit 19 having an automatically actuated and manually controlled choke valve 20.

The manifold discharges to a tank 21 from which leads a suction pipe 22 to intake manifold 23 whence liquid passes to spring-closed inlet valves 24.

The choke valve 20 has a link rod 25 provided with a collar 26 against which reacts a spring 27 in a link sleeve 28. This sleeve has a fixed, fuel throttle rod 29 connected to and operating the fuel throttle valve 30 of the fuel manifold of the motor.

The rod 25 and the sleeve 28 are connected for positive action in one direction by a cap 32 on which the collar 26 is seated and through which the rod link slides free. The parts 25 and 28 are capable of lost motion in one direction so that the throttle can be closed down while the choke valve 20 is held open, as by a stop lever 33, under manual action.

Means, driven by the motor shaft 2, as by gear train 34—35, is provided to automatically control the by-pass valve 20, forming a choke for the pump, and the fuel throttle 30 concurrently.

As here shown this means includes a governor shaft 36 (with gear 35) having a set of centrifugal dogs 37 whose levers engage a sliding block 38 which is loose on a fixed trunnion 39 and has an arm 40 carrying the sleeve 28. The governor block 38 is thrust endwise to retract the dog or ball levers 37 by a master spring 41 on the trunnion 39. This spring forms a means whereby to regulate the speed of the motor at any desired constant, and thereby the constant of the final drive shaft 6.

The retardant action of the spring 41 is varied by a cam-collar 42 splined on the trunnion 39 and shiftable by a rocking cam 43 operated by suitable means, as a manual setting lever 44.

While it is thought that the mode of operation is apparent from the above, the following explanation is given:

With the master spring 41 set to give a light retarding pressure against the governor block the motor is initially turned over or started by any desired means, all of the control parts being in the position shown: that is, pump, by-pass valve 20 and throttle 30 wide open. It will be understood that the load on the spindle 6 will hold the gear 11 stationary and therefore the ring gear will spin and drive gear 12 and its connected pumps 15. The by-pass 20 being fully open allows the engine to speed up with the result that the governor will throw the arm 40 to the left and, through spring 27, tend to push the link rod 25 over and close the by-pass and at the same time close off the throttle 30, to reduce motor speed. The lever 33 is initially held to support the rod 25 and hold the by-pass open until the motor gets a good start even though it is closing the fuel throttle 30. The stop lever 33 is now released and the compressed spring 27 will act on the rod 25 and move the valve 20 to reduce flow in the conduit 19 so that resistance is thrown on the gear 12 and power is transferred to the gear 11 and the drive spindle 6.

As long as the load is constant the governor holds the valves 20—30 at a position determined by the master spring 41, as set by hand (or manually). If the load increases the motor tends to slow down with the result that the governor opens the resistance valve 20 and the throttle valve 30 at the same time and this causes increment in speed of the motor to meet the imposed load and carry it at the set speed, because of the pressure of the governor spring 41.

If the load decreases the automatic action is just the reverse: The speeded up motor acts on the governor to cause it to reduce fuel supply and to increase hydraulic pump resistance.

To vary the desired running (or constant) speed it is only necessary to increase or decrease the pressure of the control spring 41 on the governor. Increasing this pressure demands a faster speed of the motor to throw the governor, and vice versa.

What is claimed is:

1. Power transmitting apparatus including a motor, a governor for the motor, a differential gear set driven by the motor, a resistance means controlling action of a member of the said set and connected to the governor and a manual means to operatively disconnect the said means from the governor.

2. Power transmission apparatus including a motor having a throttle, a governor for the motor throttle, a differential gear set driven by the motor, and a fluid pump resistance means controlling action of a member of the said set and connected to said throttle and means to operatively disconnect the throttle and said means.

3. Power transmitting apparatus including a motor, a differential gear set driven thereby, and means to prevent stalling of the motor and including a variable resistance instrumentality connected to the set and an automatic governor connected to the motor and to said instrumentality and whereby the motor is caused to vary its speed in accordance with the load and whereby the resistance means is regulated and a manual control to negative the governor as to said instrumentality.

4. Power transmitting apparatus including a differential gear set, means for driving a member thereof, an automatic governor for said means, a hydraulic control means connected to said set and being under the control of the governor and a manual control device for the governor.

5. Power transmitting apparatus including a differential gear set, means for driving a member of said set, a governor for said means, a hydraulic control means connected to the set and operatively under control of the governor, and a device for rendering said control independent of the governor for starting purposes.

6. Power transmission means including a prime mover and a power regulator therefore, a differential gear set driven by the mover, a hydraulic resistance means controlling a member of said set, a control valve for the resistance, a governor including a lost motion link connecting the valve and the regulator, and a manual control device for negation of action of the governor, through the link, on the valve.

7. Power transmission means including a prime mover and a power regulator therefore, a differential gear set driven by the mover, a hydraulic resistance means controlling a member of said set, a control valve for the resistance, a governor including a lost motion link connecting the valve and the regulator, and a manual control device for negation of action of the governor, through the link, on the valve, and manual means to vary the speed setting of the governor.

LAWRENCE G. WEYLANDT.